United States Patent Office 3,438,979
Patented Apr. 15, 1969

3,438,979
2 - AMINOMETHYL - 3 - (17β - HYDROXY - 3 - OXO-ANDROST-4-EN-17α-YL)-PROPIONIC ACID LACTONES AND INTERMEDIATES
Edward A. Brown, Wilmette, Ill., assignor to G. D. Searle & Co., Chicago, Ill., a corporation of Delaware
No Drawing. Filed Aug. 11, 1966, Ser. No. 571,722
Int. Cl. C07c *173/00, 173/10;* A61k *27/00*
U.S. Cl. 260—239.57   5 Claims

ABSTRACT OF THE DISCLOSURE

Preparation of the captioned compounds, such as 2-diethylaminomethyl - 3 - (17β - hydroxy - 3 - oxoandrost-4-en-17α-yl)propionic acid γ-lactone, and their valuable biological properties, including pepsin-inhibiting, anti-inflammatory, and antibiotic properties, are disclosed.

---

This invention relates to 2-aminomethyl-3-(17β-hydroxy-3-oxoandrost-4-en-17α-yl)propionic acid lactones and intermediates, and to processes for the preparation thereof. More particularly, this invention provides new, useful, and unobvious chemical compounds of the formula

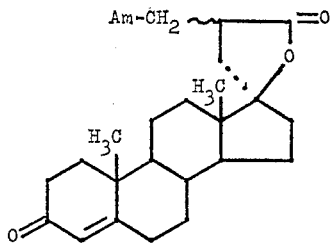

wherein Am represents a tertiary amino radical such as dialkylamino, pyrrolidino, piperidino, or morpholino. Among the alkyl constituents called for, lower alkyl groupings are preferred, i.e., monovalent, saturated, acyclic, straight- or branched-chain, hydrocarbon radicals of empirical formula

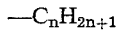
—$C_nH_{2n+1}$ wherein $n$ represents a positive integer less than 8. Typical of such lower alkyl groupings are methyl, ethyl, propyl, isopropyl, butyl, isobutyl, sec-butyl, tert-butyl, pentyl, neopentyl, hexyl, isohexyl, heptyl, etc. The suffix "ino" indicates that the radicals called for are unexceptionably attached via nitrogen to the lactone ring.

The compounds to which this invention relates are useful because of their valuable pharmacological properties. They inhibit proteolysis of hemoglobin by pepsin; counteract the inflammatory response to tissue insult; and are anti-biotic versus *Diplococcus pneumoniae, Tetrahymena gelleii, Tricophyton mentagrophytes, Candida albicans, Chlorella vulgaris,* and similar organisms.

The foregoing compounds eventuate by contacting 3-(3β,17β - dihydroxyandrost - 5 - en - 17α - yl)propionic acid γ-lactone (U.S. 2,705,712) with an appropriate dialkyl carbonate

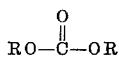

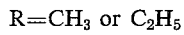
R=CH₃ or C₂H₅ in the presence of sodium hydride to produce the corresponding 3β,17β - dihydroxyandrost - 5 - en - 17α - yl-methyl-malonate γ-lactone ester, saponifying the ester by heating with aqueous alcoholic potassium hydroxide and thereupon acidifying with hydrochloric acid to re-form the lactone ring, contacting the lactone acid with an appropriate secondary amine

Am—H

Am being defined as above in aqueous methanolic formaldehyde to give the corresponding 2-aminomethyl-3-(3β,17β - dihydroxyandrost - 5 - en - 17α - yl)propionic acid γ-lactone, and subjecting the latter compound to Oppenauer oxidation.

Equivalent to the basic amines of this invention for the purposes set forth are non-toxic acid addition and quaternary ammonium salts thereof having the formula

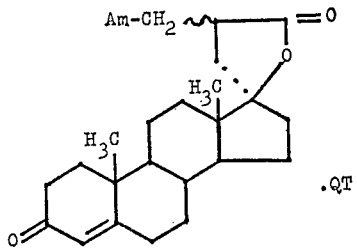

wherein Am is defined as before; Q is selected from among hydrogen and lower alkyl, hydroxy(lower alkyl), and lower alkenyl radicals, as also such aralkyl radicals as benzyl, phenethyl, and naphthylmethyl; and T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage.

Conversion of the amine bases of this invention to corresponding acid addition salts is accomplished by simple admixture of these compounds with 1 equivalent of any of various inorganic and strong organic acids, the anionic portion of which conforms to T as hereinabove defined.

The quaternary ammonium compounds comprehended by this invention are those derived by contacting a claimed base with an organic ester of the formula

Q—T

Q and T being limited by the meanings hereinbefore assigned, and it being additionally provided that Q is not hydrogen. Quaternization takes place in the temperature range between 25° and 100° C., using an inert solvent such as chloroform, acetone, butanone, methanol, butanol, or the like as reaction medium. Quaternization is ordinarily completed in from 1 to 48 hours and is generally carried out in a closed system if a lower alkyl halide —such as methyl chloride—is one of the reagents. Using methyl bromide, the preparation of quaternary salts can be smoothly effected in butanone solution at 70° C., the reaction time being approximately 1 hour.

The following examples describe in detail compounds illustrative of this invention and methods which have been devised for their preparation. However, the invention is not to be construed as limited thereby, either in spirit or in scope, since it will be apparent to those skilled

3 in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight except as otherwise noted.

Example 1

(A) Methyl 3β,17β-dihydroxyandrost-5-en-17α-ylmethylmalonate γ-lactone.—To 15 parts of a 56% dispersion of sodium hydride in mineral oil suspended in 60 parts of dimethyl carbonate is added, during 10 minutes with stirring, a solution of 30 parts of 3-(3β,17β-dihydroxyandrost-5-en-17α-yl)propionic acid lactone in 360 parts of dimethyl carbonate. Stirring is continued for 6 hours, whereupon the resultant heavy slurry is allowed to stand for 90 hours. Insoluble solids are filtered off, washed with hexane, and extracted with 800 parts of boiling ethanol. The ethanol extract is acidified to pH 6 with glacial acetic acid and then concentrated to 15% of its original volume by distillation. To the concentrate is added 3⅓ volumes of water. The tacky precipitate thrown down is filtered off and taken up to 270 parts of ethyl acetate. The ethyl acetate solution is washed with water, dried over anhydrous sodium sulfate, and stripped of solvent by vacuum distillation. The viscous residue is methyl 3β,17β-dihydroxyandrost-5-en-17α-ylmethylmalonate γ-lactone.

(B) 3β,17β-dihydroxyandrost-5-en-17α-ylmethylmalonic acid γ-lactone.—To a solution of 290 parts of methyl 3β,17β-dihydroxyandrost-5-en-17α-ylmethylmalonate γ-lactone in 2400 parts of methanol is added a solution of 106 parts of 85% potassium hydroxide in 200 parts of water. The resultant mixture is heated at the boiling point under reflux for 30 minutes, then chilled. The precipitate thrown down is filtered off and suspended in 200 parts of warm ethanol. The suspension is acidified with dilute hydrochloric acid, thereby effecting solution. The solution is diluted with 4 volumes of water, precipitating 3β,17β-dihydroxyandrost-5-en-17α-ylmethylmalonic acid γ-lactone which, filtered off and recrystallized from acetone, melts at 164–165° with decomposition.

(C) 2-dimethylaminomethyl-3-(3β,17β-dihydroxyandrost-5-en-17α-yl)propionic acid γ-lactone.—To a cold (5°) suspension of 12 parts of 3β,17β-dihydroxyandrost-5-en-17α-ylmethylmalonic acid γ-lactone in 3 parts of aqueous 37% formaldehyde and approximately 10 parts of methanol is added a cold solution of 15 parts of dimethylamine in 160 parts of methanol. The resultant mixture is allowed to stand at room temperatures for 24 hours, then stripped of solvent by distillation under nitrogen. The viscous residue is triturated with 140 parts of ether, affording 2-dimethylaminomethyl-3-(3β,17β-dihydroxyandrost-5-en-17α-yl)propionic acid γ-lactone as a solid product which is separated by filtration and further purified by crystallization from methanol.

(D) 2-dimethylaminomethyl-3-(17β-hydroxy-3-oxoandrost-4-en-17α-yl)propionic acid γ-lactone.—To a solution of 2 parts of 2-dimethylaminomethyl-3-(3β,17β-dihydroxyandrost-5-en-17α-yl)propionic acid γ-lactone in 72 parts of dry toluene and approximately 12 parts of cyclohexanone at the boiling point under nitrogen is added a solution of 2 parts of aluminum isopropoxide in 27 parts of toluene. The resultant mixture is heated at the boiling point under reflux in a nitrogen atmosphere for 30 minutes, then cooled to room temperature and hydrolyzed thereat by slowly incorporating approximately 9 parts of saturated aqueous Rochelle salt. Non-aqueous solvent is removed by steam distillation. The residue is chilled. The tacky precipitate which forms is filtered off, washed with water, and taken up in benzene. The benzene solution is dried over anhydrous sodium sulfate and stripped of solvent by vacuum distillation. The residue is 2-dimethylaminomethyl-3-(17β-hydroxy-3-oxoandrost-4-en-17α-yl)propionic acid γ-lactone, having the formula

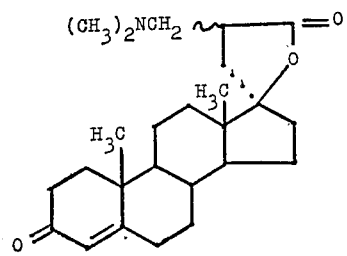

Example 2

(A) 2-diethylaminomethyl-3-(3β,17β-dihydroxyandrost-5-en-17α-yl)propionic acid γ-lactone.—A solution of 175 parts of diethylamine in 37 parts of aqueous 37% formaldehyde and 112 parts of methanol is allowed to stand at room temperature for 90 hours, during which a precipitate forms. The precipitate is filtered off, washed with ether, and dried in air. The product thus isolated is 2-diethylaminomethyl-3-(3β,17β-dihydroxyandrost-5-en-17α-yl)propionic acid γ-lactone.

To a warm solution of 55 parts of 2-diethylaminomethyl-3-(3β,17β-dihydroxyandrost-5-en-17α-yl)propionic acid γ-lactone in 400 parts of 2-propanol is added a solution of 11 parts of hydrogen chloride in 40 parts of 2-propanol. From the resultant solution, on chilling, 2-diethylaminomethyl-3-(3β,17β-dihydroxyandrost-5-en-17α-yl)propionic acid γ-lactone hydrochloride crystallizes. The hydrochloride, isolated by filtration and dried in air, melts at 238–242°.

To a solution of 2 parts of 2-diethylaminomethyl-3-(3β,17β-dihydroxyandrost-5-en-17α-yl)propionic acid γ-lactone in approximately 25 parts of benzene is added approximately 55 parts of methyl iodide. The resultant mixture is allowed to stand at room temperatures for 24 hours, whereupon the white precipitate thrown down is filtered off, washed with benzene, dried in air, and recrystallized from methanol to give 2-diethylaminomethyl-3-(3β,17β-dihydroxyandrost-5-en-17α-yl)propionic acid γ-lactone methiodide melting at approximately 242°.

(B) 2-diethylaminomethyl-3-(17β-hydroxy-3-oxoandrost-4-en-17α-yl)propionic acid γ-lactone.—Substitution of 2 parts of 2-diethylaminomethyl-3-(3β,17β-dihydroxyandrost-5-en-17α-yl)propionic acid γ-lactone for the 2-dimethylaminomethyl-3-(3β,17β-dihydroxyandrost-5-en-17α-yl)propionic acid γ-lactone called for in Example 1D affords, by the procedure there detailed, 2-diethylaminomethyl-3-(17β-hydroxy-3-oxoandrost-4-en-17α-yl)propionic acid γ-lactone which, crystallized from ethyl acetate, melts at approximately 70°. The product has the formula

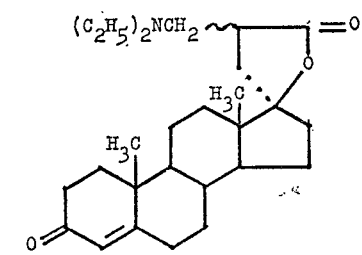

To a solution of 150 parts of 2-diethylaminomethyl-3-(17β-hydroxy-3-oxoandrost-4-en-17α-yl)propionic acid γ-lactone in 2000 parts of warm 2-propanol is added a solution of 33 parts of hydrogen chloride in 120 parts of 2-propanol. The resultant mixture is chilled. The precipitate which forms is filtered off and dried in air. The product thus isolated is 2-diethylaminomethyl-3-(17β-hydroxy-3-oxoandrost-4-en-17α-yl)propionic acid γ-lactone hydrochloride melting at 247–258°.

Example 3

(A) 3 - (3β,17β - dihydroxyandrost - 5-en-17α-yl)-2-piperidinomethylpropionic acid γ-lactone.—Substitution of 203 parts of piperidine for the diethylamine called for in Example 2A affords, by the procedure there detailed, 3 - (3β,17β - dihydroxyandrost-5-en-17α-yl)-2-piperidinomethylpropionic acid γ-lactone.

(B) 3 - (17β - hydroxy - 3-oxoandrost-4-en-17α-yl)-2-piperidinomethylpropionic acid γ-lactone.—Substitution of 2 parts of 3-(3β,17β-dihydroxyandrost-5-en-17α-yl)-2-piperidinomethylpropionic acid γ-lactone for the 2-dimethylaminomethyl - 3 - (3β-17β-dihydroxyandrost-5-en-17α-yl)propionic acid γ-lactone called for in Example 1D affords, by the procedure there detailed, 3-(17β-hydroxy-3 - oxoandrost-4-en-17α-yl)-2-piperidinomethylpropionic acid γ-lactone, the formula of which is

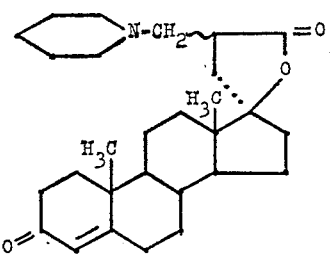

What is claimed is:
1. A compound of the formula

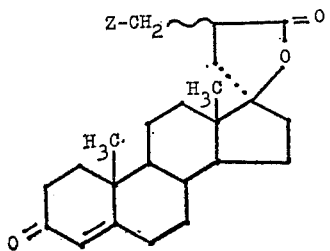

wherein Z represents di(lower alkyl)amino, pyrrolidino, piperidino, or morpholino.

2. A compound according to claim 1 having the formula

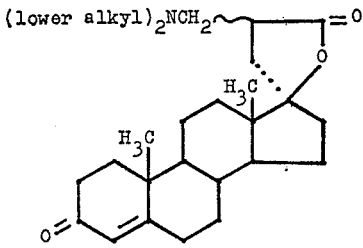

3. A compound according to claim 1 which is 2-diethylaminomethyl - 3 - (17β-hydroxy-3-oxoandrost-4-en-17α-yl)propionic acid γ-lactone.

4. A compound of the formula

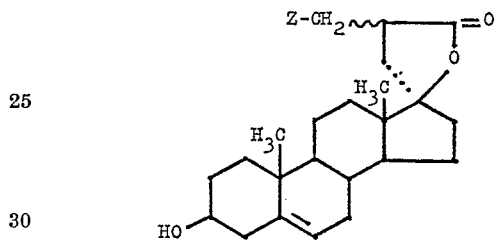

wherein Z represents di(lower alkyl)amino, pyrrolidino, piperidino, or morpholino.

5. A compound according to claim 4 which is 2-diethylaminomethyl - 3 - (3β,17β-dihydroxyandrost-5-en-17α-yl)propionic acid γ-lactone.

References Cited
UNITED STATES PATENTS
3,300,489   1/1967   Holden _____ 260—239.57

LEWIS GOTTS, *Primary Examiner.*

E. C. LOVE, *Assistant Examiner.*